United States Patent [19]
Pierson

[11] Patent Number: 5,812,258
[45] Date of Patent: Sep. 22, 1998

[54] OPTICAL COUPLER AND ALIGNMENT APPARATUS WITH MULTIPLE ECCENTRIC ADJUSTMENTS

[75] Inventor: James G. Pierson, Bolton, Canada

[73] Assignee: Sentech Systems, Inc., Mount Joy, Pa.

[21] Appl. No.: 560,651

[22] Filed: Nov. 20, 1995

[51] Int. Cl.⁶ .................................................... G02B 6/42
[52] U.S. Cl. ................................ 356/153; 385/67; 385/90
[58] Field of Search .................................. 356/138, 153; 385/67, 68, 88, 90, 52

[56] References Cited

U.S. PATENT DOCUMENTS

| | | | |
|---|---|---|---|
| 3,936,143 | 2/1976 | Sato | 385/67 |
| 4,764,983 | 8/1988 | Walter . | |
| 4,867,560 | 9/1989 | Kunitsugu . | |
| 4,879,764 | 11/1989 | Walter . | |
| 4,882,772 | 11/1989 | Rist et al. . | |
| 4,993,801 | 2/1991 | Sarraf . | |
| 5,042,890 | 8/1991 | Wehrle et al. | 385/90 |
| 5,283,802 | 2/1994 | Hsiung . | |
| 5,450,245 | 9/1995 | Grotzinger . | |

FOREIGN PATENT DOCUMENTS

| | | | |
|---|---|---|---|
| 2553525 | 4/1985 | France | 385/67 |
| 3705-408-C | 8/1988 | Germany . | |
| 63-6510 | 1/1988 | Japan . | |
| 1-270009 | 10/1989 | Japan . | |
| 1485181 | 6/1989 | U.S.S.R. | 385/90 |

*Primary Examiner*—Samuel A. Turner
*Attorney, Agent, or Firm*—Martin Fruitman

[57] ABSTRACT

The present invention adjusts the relationship of two optical components within an optical coupler by the use of eccentric sleeves. As individual eccentric sleeves of an adjustable subassembly are rotated, they change either the angle or the location of the axis of one optical component relative to the location of the axis of another fixed optical component. Adjustment of the alignment of the optical components therefore requires only the rotation of the sleeves of the adjustable subassembly. Locking the sleeves into a selected adjustment is accomplished by the insertion of a low expansion, quick setting, bonding agent into holes located so that they feed the bonding agent into the spaces between the sleeves. Thus, after the bonding agent has fused together the otherwise movable parts, any further movement of the sleeves is prevented, and the alignment is permanently preserved.

4 Claims, 2 Drawing Sheets

OPTICAL COUPLER AND ALIGNMENT APPARATUS WITH MULTIPLE ECCENTRIC ADJUSTMENTS

BACKGROUND OF THE INVENTION

This invention deals generally with optical transmission systems and more specifically with an optical coupler and alignment apparatus for accurately coupling one optical transmission path to another.

Optical fiber communications paths are becoming more significant in technology every day. Such transmission paths are used for long distance communications because of their large bandwidth capabilities, because of their low loss characteristics, and because they can be oriented with reasonable radii to permit the cables in which they are enclosed to be installed on support poles or to be laid in curves to change direction.

What is not always appreciated about such systems, however, is that the optical signal, usually generated by a laser diode, must enter at the end of the optical fiber, and that, since the individual fibers are so very small, it is difficult to reliably accomplish and maintain alignment between the end of the optical fiber and the source of the optical signal. Similar alignment requirements must also be met for collimators and detectors and for the insertion of other devices, such as attenuators, amplifiers, and splitters, into an optical fiber system.

In prior art units, a subassembly including the laser source is typically attached to a second subassembly which includes the end of the optical fiber. These two subassemblies are usually joined by a system which permits angular adjustment between the axis of the optical beam and the end face of the optical fiber.

The typical prior art system which secures the specific required angle between a laser beam and the end face of an optical fiber uses three screws penetrating one plate, which is attached to either the laser diode or the optical fiber, with the screws threaded into an adjacent plate attached to the other optical device. Thus, changing the length of the screws between the plates, which is accomplished by turning one or more screws, changes the orientation of the face of one plate relative to the face of the other plate. Such three point systems usually use set screws penetrating one of the plates and forced against the second plate to lock the setting.

Without some sort of device to freeze the adjustment, there is no assurance that the setting will survive for any length of time. However, systems which are dependent upon the use of set screws, screws with ends forced against another surface, are not satisfactory to maintain a previously determined setting for applications which experience significant temperature variations or high mechanical shock. When several set screws are used to lock an assembly into a particular orientation, each of the set screws is subjected to a severe and unique stress, and those different stresses change unpredictably when subjected to either mechanical shock or changing temperatures. A temperature difference between different surfaces of an optical coupler can, of course, tighten or loosen one set screw without affecting the others. However, even a uniform temperature change for the whole coupling apparatus can loosen the set screws at different rates because of the differences in stress to which the screws are subjected.

Moreover, highly stressed areas that exist between set screws and the point against which they press are subject to metal creep phenomenon which results in relaxation of preloads. Because of this, prior art designs which use set screws are subject to time related drift from original alignment settings, even if there are no temperature variations. Since extreme precision is required for the mechanical adjustment of optical coupling systems, even the slightest creep related motion prevents proper operation of the optical system.

The conventionally adjusted optical coupling assemblies with set screws to preserve the settings simply are not satisfactory for use in high precision optical couplers.

SUMMARY OF THE INVENTION

The present invention solves the problem of the susceptibility of optical couplers to instability by completely eliminating the use of set screws for adjustment and locking of positions in the apparatus. The invention uses a structure with virtually zero stress and thereby precludes even stress related creep, resulting in a highly stable alignment. The invention has a fixed subassembly with a central hole, within which is fixed a laser diode or other first optical component. Attached to the fixed subassembly is an adjustable subassembly with eccentric sleeves, and into the innermost of these sleeves is inserted an optical fiber or other second optical component. As individual eccentric sleeves of the adjustable subassembly are rotated, they change either the angle of the axis of the second optical component or the location of the axis of the second optical component relative to the location of the axis of the first optical component located in the fixed subassembly. Adjustment of the alignment of the first and second optical components therefore requires only the rotation of the sleeves of the adjustable subassembly.

Locking the sleeves of the invention into a selected position is also quite simple. All that is required is the insertion of a low expansion, quick setting, bonding agent into holes located so that they feed the bonding agent into the spaces between the sleeves. Thus, after the bonding agent has fused together the otherwise movable parts, any further movement of the sleeves is prevented, and the alignment is permanently preserved.

Although the preferred bonding agent is polymeric in nature, and therefore can show plastic behavior, such bonding agents have low viscosity permitting the penetration of even metal to metal surfaces. Additionally, the zero stress structure of the coupler precludes any sustained forces on the bonding agent, therefore preventing any movement of the cured bonding agent.

The inner sleeve of the adjustable subassembly is essentially a cylinder with a longitudinal through hole, with one end of the inner sleeve and one end of the longitudinal hole located adjacent to a central hole in the fixed subassembly in which a first optical component, such as a laser diode, is located. The axis of the longitudinal through hole is located slightly displaced from but parallel to the axis of the cylinder of the inner sleeve. In the preferred embodiment the actual displacement of the axis of the hole from the axis of the cylinder is approximately one half the radius of the hole. The inner sleeve also has some other features on its outer surface, such as ridges to capture the inner sleeve within the adjustable subassembly and an end wheel to facilitate rotating the inner sleeve.

In a typical application, an optical fiber is located in the longitudinal hole in the inner sleeve with the end face of the optical fiber adjacent to the end of the longitudinal hole which approaches a laser diode mounted within the fixed subassembly. Therefore, because of the offset of the axis of the longitudinal hole relative to the axis of the inner sleeve, as the inner sleeve is rotated on its axis, the end of the hole, and of the face of the optical fiber within it, moves around the axis of the cylinder to furnish movement of the end face of the optical fiber in the plane of the end surface of the inner sleeve.

However, the rotation of the inner sleeve restricts the movement of the end of the longitudinal hole to a fixed radius around the axis of the cylinder, and it is necessary to have infinite adjustment within the plane of the end face of the optical fiber to assure perfect alignment with the laser diode, or any other component mounted in the fixed subassembly.

This further adjustment is accomplished by a second eccentric system. The inner sleeve is mounted within an outer cylindrical sleeve which is itself mounted within an outer housing and captured within the outer housing by the use of several ridges and offsets in the outer surface of the outer sleeve. While the cylinder of the outer sleeve is mounted coaxially with the outer housing, the inner sleeve is mounted within the outer sleeve so that the axis of the inner sleeve is offset from the axis of the outer sleeve. Therefore, as the outer sleeve is rotated within the outer housing, the end of the hole in the inner sleeve is subjected to an additional motion within the plane of the end of the cylinder of the inner sleeve.

These two eccentric rotations, one as the inner sleeve is rotated to move the longitudinal hole around the axis of the inner sleeve, and the second as the outer sleeve is rotated to move the entire inner sleeve around the axis of the outer sleeve, are sufficient to align the end face of any component mounted within the longitudinal hole with any component located within the central hole in the fixed subassembly. In a simple context, the eccentric movement of the through hole within the inner sleeve can be thought of as determining the direction of the displacement of the end of the longitudinal hole relative to the central hole in the fixed subassembly, while the eccentric movement of the inner sleeve within the outer sleeve adjusts the magnitude of that displacement.

This geometry permits the optical fiber face to be moved up, down, and sideways enough to compensate for misalignment due to manufacturing tolerances, and it permits the optical fiber face, or any other component mounted in the longitudinal hole in the adjustable subassembly, to always be placed in a position in which it is precisely aligned with the component in the central hole of the fixed subassembly.

A third system of eccentric movement is used to change the angle of the axis of the longitudinal hole relative to the axis of the central hole in the fixed subassembly. For this angular adjustment, the outer sleeve is furnished with a partial spherical surface forming a ball joint at its end nearest to the fixed subassembly, and an inner eccentric ring contacts the outer surface of the outer sleeve at a location axially remote from the ball joint. Therefore, as the eccentric ring is rotated, one part of the outer sleeve is moved relative to the axis of the adjustable subassembly while the end of the sleeve is prevented from moving away from the axis by the ball joint which acts as a pivot point.

Since this single eccentric ring provides movement in only a single path, the inner eccentric ring is itself installed within an outer eccentric ring. This combination of two eccentric movements provides a continuous adjustment capability within the range of angular adjustment for which the eccentric rings are selected. It is convenient to think of the inner eccentric ring as providing the direction of the angle of pivoting of the outer sleeve and the outer eccentric ring as providing the magnitude of the angle of the pivot. Thus, together the two eccentric rings provide full adjustment of the angle of the axis of the outer sleeve relative to the axis of the central hole in the fixed subassembly.

One other optional adjustment can be added to the optical coupler of the invention to provide a mechanical mechanism which actually provides precision motion in five axes. In order to furnish an axial adjustment so that one optical component can be focused upon a second optical component by the use of a lens, the fixed subassembly is split into three parts. The first part, the base, is attached to the second part, a rotating sleeve, by means of a ball bearing, and the third part, an extension of the housing which holds the fixed subassembly and the adjustable subassembly together, is mated to the rotating sleeve through threads. Therefore, when the rotating sleeve is turned, the rotating sleeve and anything attached to it, such as a lens, moves along the threads of the housing extension, and moves parallel to the axis of the fixed subassembly. Such movement permits a lens attached to the rotating sleeve to vary the focus of an optical source within the fixed subassembly upon an optical component in the attached adjustable subassembly.

However, as with the sleeves of the adjustable subassembly, the axial adjustment within the fixed subassembly includes radial openings which furnish access to the spaces between the moveable parts. This permits a liquid bonding agent to be inserted into the fixed assembly which, when hardened, will lock the focus adjustment and preserve it.

The present invention thereby furnishes an optical coupler which includes simple and reliable adjustment capability in each of five axes, and which can be locked in the settings selected to assure the maintenance of the selected adjustments regardless of the temperatures or mechanical shock to which the optical coupler is subjected.

DETAILED DESCRIPTION OF THE INVENTION

STRUCTURE OF THE INVENTION

Figure 1:
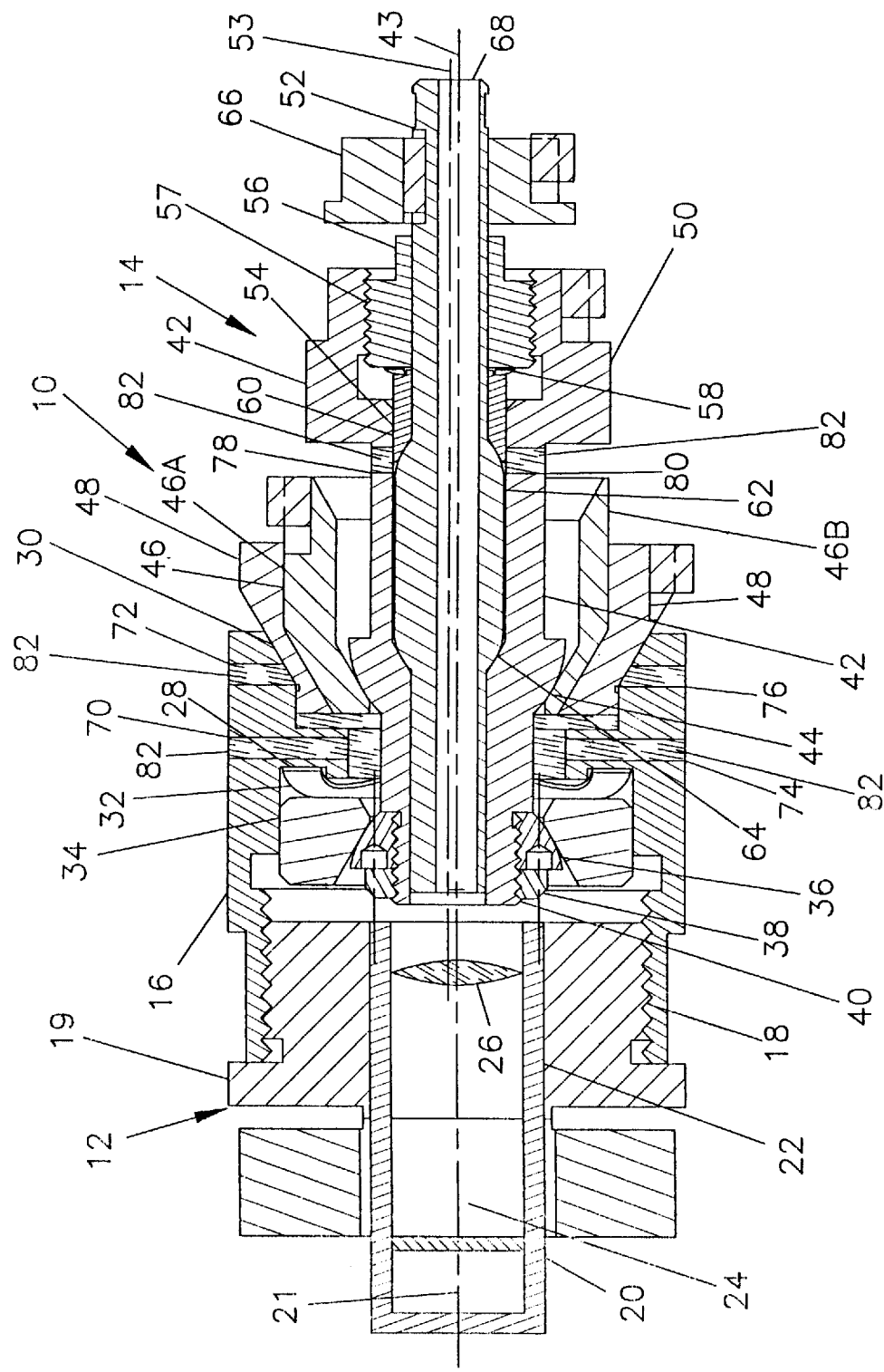
FIG. 1 is a cross section drawing of the preferred embodiment of an adjustable four axis optical coupler.

FIG. 1 is a cross section drawing of the preferred embodiment of an adjustable four axis optical coupler 10 which includes fixed subassembly 12 and adjustable subassembly 14 which are interconnected by housing 16.

Fixed subassembly 12 is attached to housing 16 by means of threads 18 on extension 19, and cylinder 20 is fixed within central hole 22 in fixed subassembly 12. Typically, laser diode 24 and lens 26 are fixed within cylinder 20 by conventional means, but the particular optical components installed within fixed subassembly 12 are not important to the invention. Regardless of the optical components installed within both fixed subassembly 12 and adjustable subassembly 14, the optical coupler of the invention in capable of aligning the optical component in adjustable subassembly 14 with the optical component in fixed subassembly 12.

Adjustable subassembly 14 is held together essentially by being clamped around web 28 and inclined surface 30 of housing 16. Wave spring 32 is held against web 28 by ring 34 to which force is applied by ball joint 36 and nut 38 which are threaded onto threads 40 on outer sleeve 42. The opposing force is supplied by curved surface 44 on outer sleeve 42 which forces inner eccentric ring 46 against outer eccentric ring 48 which is forced against inclined surface 30 of outer sleeve 42. Wheel 50, which is an integral part of outer sleeve 42 is used to rotate outer sleeve 42 when desired.

Inner eccentric ring 46, within which outer sleeve 42 is mounted, and outer eccentric ring 48, within which inner eccentric ring 46 is mounted, are both constructed with holes within their ring cylinders. Each of the holes has its axis offset from the cylinder of its ring to form the eccentric ring.

Inner sleeve 52 is mounted within outer sleeve 42 within a longitudinal hole 54 whose central axis 53 is parallel to but offset from central axis 43 of outer sleeve 42. Inner sleeve 52 is captured within outer sleeve 42 by using cap 56 with threads 57, which mate with outer sleeve 42, to compress wave spring 58 against fitting 60 and force outer protrusion 62 of inner sleeve 52 against surface 64 of outer sleeve 42. Wheel 66 is attached near the end of inner sleeve 52 remote from fixed subassembly 12 to facilitate rotating inner sleeve 52.

Longitudinal hole 68 is located within inner sleeve 52 with the axis of longitudinal hole 68 offset from but parallel to central axis 53 of inner sleeve 52. Optical components such as optical fiber 69 (FIG. 2) can be installed within longitudinal hole 68 and, because of the several modes of adjustment of adjustable subassembly 14, such optical components within longitudinal hole 68 can be precisely aligned with axis 21 of cylinder 20 in fixed subassembly 12 and with the optical components, such as laser diode 24 and lens 26, installed within fixed subassembly 12.

Transverse holes 70, 72, 74, 76, 78, 80, and annular space 81 (FIG. 2) are all located to provide access to the several adjacent moving surfaces between the various parts of the optical coupler. Thus, when the transverse holes and annular space 81 are filled with liquid bonding compound 82, and bonding compound 82 hardens, all further movement of the various parts relative to each other is prevented and the previously attained settings are preserved.

Figure 2:
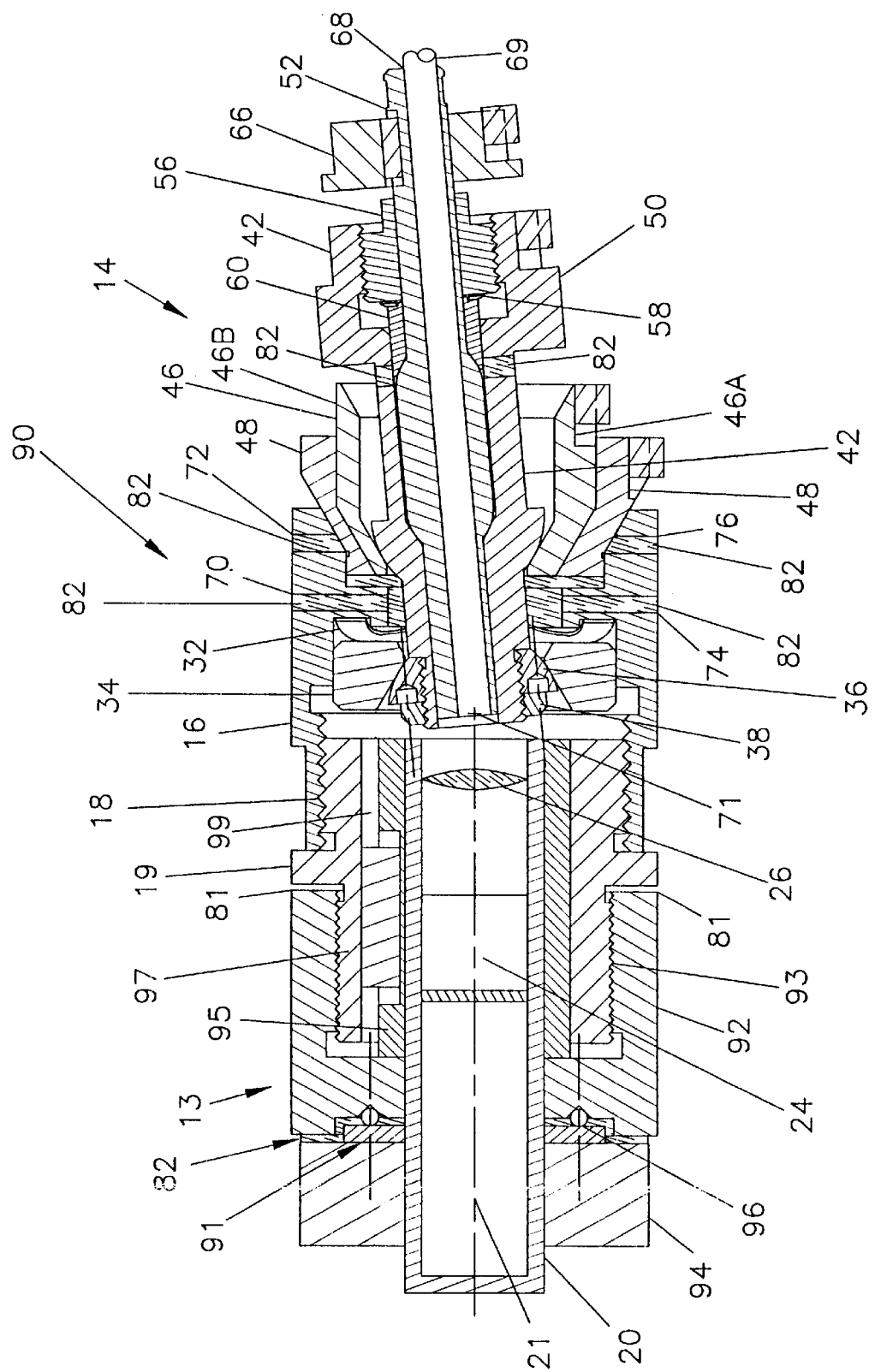
FIG. 2 is a cross section drawing of the preferred embodiment of an adjustable five axis optical coupler shown so that the adjustable subassembly is oriented at an angle to the axis of the fixed subassembly.

FIG. 2 is a cross section drawing of the preferred embodiment of an adjustable five axis optical coupler 90 shown with adjustable subassembly 14 oriented at an angle to the axis of the fixed subassembly 13. Adjustable subassembly 14 is exactly the same structure as shown in FIG. 1, and the parts have therefore been assigned the same numbers.

However, fixed subassembly 13 in FIG. 2 is different from fixed subassembly 12 in FIG. 1 in that in FIG. 2 cylinder 20, within which optical components such as laser diode 24 and lens 26 are installed, can be moved longitudinally along its axis. Fixed subassembly 13 in FIG. 2 is constructed with rotating sleeve 92 attached to extension 19 at threads 93, and with cylinder 20 attached to base 94. Base 94 is then interconnected with rotating sleeve 92 by ball bearing 96 and thrust washer 91, and slotted sleeve 95 is attached to cylinder 20 while key 97 is mates with extension 19 in slot 99. Thus, rotating sleeve 92 can be rotated without turning cylinder 20 and the optical components installed within it. However, as rotating sleeve 92 is rotated it moves axially along treads 93, thus changing the axial position of the optical components within fixed subassembly 13.

OPERATION OF THE INVENTION

The axial movement of cylinder 20 described above in regard to FIG. 2 permits varying the position of the focal point of an optical component such as lens 26 relative to optical components installed within longitudinal hole 68 in adjustable subassembly 14. Merely turning rotating ring 92 moves the focal point of lens 26 along the axis of cylinder 20 and permits locating the focal point of lens 26 precisely upon end face 71 of optical fiber 69.

Continuing with reference to FIG. 2, centering of the focal point of lens 26 upon end face 71 of optical fiber 69 is accomplished by rotating inner sleeve 52 by using wheel 66. Since longitudinal hole 68 is located off the central axis of inner sleeve 52, rotating inner sleeve 52 moves longitudinal hole 68 around the axis of inner sleeve 52, thus, moving the end of longitudinal hole 68 up, down, and to either side of axis 21 of fixed subassembly 13 upon which the focal point of lens 26 is located.

However, the motion provided by rotating inner sleeve 52 is on the fixed radius of the distance between the axis of longitudinal hole 68 and the axis of inner sleeve 52, so essentially it provides only the direction of the adjustment in the plane of the end of inner sleeve 52. The amplitude of the motion in that plane is furnished by the rotation of outer sleeve 42 by means of its integral wheel 50. Since inner sleeve 52 is mounted within outer sleeve 42 parallel to but off the axis of outer sleeve 42, rotating outer sleeve 42 furnishes a second eccentric motion to end face 71 of optical fiber 69. It is the difference between the paths of the two eccentric motions which provides the amplitude variation of the motion in the plane of end face 71 of optical fiber 69. The combination of the two eccentric rotations furnishes a continuous adjustment capability across the plane of end face 71.

The operation of the invention to vary the angular relationship between adjustable assembly 14 and fixed assemblies 12 (FIG. 1) and 13 (FIG. 2) is best shown by comparing FIG. 1 to FIG. 2. Inner ring 46 is shown in FIG. 2 rotated into a different position from its position in FIG. 1. Close examination of inner ring 46 will show that its eccentric structure is indicated by portion 46A being thicker than portion 46B, that is, its central hole is not on the axis of the outer surface of the ring. However, in FIG. 2 the positions of portions 46A and 46B are reversed, so that while in FIG. 1 inner sleeve 52 and outer sleeve 42 are essentially parallel to the axis of fixed subassembly 12, in FIG. 2 inner sleeve 52 and outer sleeve 42 are shown at an angle to the axis of fixed subassembly 13. This change of angle is accomplished simply by rotating inner ring 46 which moves the central portions of inner sleeve 52 and outer sleeve 42 away from axis 21 of fixed subassembly 13 while pivoting outer sleeve 42 on the partial spherical surface of ball joint 36 which is essentially centered on axis 21 of fixed subassembly 13.

As discussed previously in regard to the eccentric movements of inner sleeve 52 and outer sleeve 42, a single eccentric rotation such as that of inner ring 46 can only provide a direction of of movement. Therefore, eccentric inner ring 46 is mounted within eccentric outer ring 48. The combination of the rotations of eccentric inner ring 46 and eccentric outer ring 48 thereby furnish adjustment of not only the direction of the angle of the axis of longitudinal hole 68 to axis 21 of fixed subassembly 13, but also the amplitude of that angle.

The present invention thereby provides an optical coupler which can precisely align a first optical component in the adjustable subassembly to a second optical component in the fixed subassembly by adjusting the position of the focal plane of the second component, by adjusting the position of the first component in the focal plane, and by adjusting the angle of the first component to the focal plane.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example various different optical components can be used within either fixed subassembly 13 or adjustable subassembly 14, and for many applications the embodiment of FIG. 1 will suffice without the angular adjustment furnished by eccentric rings 46 and 48. Moreover, the various eccentric adjustments can be varied in the distance of displacement of one axis from the other to vary the adjustment capability of the invention.

What is claimed as new and for which Letters Patent of the United States are desired to be secured is:

1. An optical alignment apparatus comprising:
   a housing;
   a first optical component, with an optical axis, mounted within the housing by attachment means;
   an outer sleeve with an axis, with an outer surface of the outer sleeve contacting a first surface within the housing so that the outer sleeve can rotate on its axis, with the outer sleeve including a first hole with an inner surface and an axis, and with the axis of the first hole offset from but parallel to the axis of the outer sleeve;
   an inner sleeve with an axis, with an outer surface of the inner sleeve within and contacting the inner surface of the first hole so that the inner sleeve can rotate on its axis, with the inner sleeve including a second hole with an axis, and with the axis of the second hole offset from but parallel to the axis of the inner sleeve;
   a second optical component fixed within the second hole in the inner sleeve, with one end of the second optical component adjacent to the first optical component;
   at least one first access means located so that the first access means provides access to the outer surface of the outer sleeve and the first surface within the housing;
   at least one second access means located so that the second access means provides access to the outer surface of the inner sleeve and the inner surface of the first hole;
   a bonding agent inserted into the first access means so that the bonding agent bonds together the outer surface of the outer sleeve and the first surface within the housing;
   a bonding agent inserted into the second access means so that the bonding agent bonds together the outer surface of the inner sleeve and the inner surface of the first hole;
   and further including:
   pivot means attached to the outer sleeve adjacent to the end of the outer sleeve nearest to the first optical component;
   an outer ring with an axis, the outer ring located remote from the pivot means, with an outer surface of the outer ring contacting a fixed surface within the housing so that the outer ring can rotate on its axis, with the outer ring including a third hole with an inner surface and an axis, and with the axis of the third hole offset from but parallel to the axis of the outer ring;
   an inner ring with an axis, the inner ring located within the third hole and remote from the pivot means, with an outer surface of the inner ring contacting the inner surface of the third hole so that the inner ring can rotate on its axis, with the inner ring including a fourth hole with an inner surface and an axis, and with the axis of the fourth hole offset from but parallel to the axis of the inner ring;
   with the outer sleeve mounted within the fourth hole in the inner ring, and the outer surface of the outer sleeve contacting the inner surface of the fourth hole;
   at least one fourth access means located so that the fourth access means provides access to the outer surface of the outer ring and the fixed surface within the housing;
   at least one fifth access means located so that the fifth access means provides access to the outer surface of the inner ring and the inner surface of the third hole;
   a bonding agent inserted into the fourth access means so that the bonding agent bonds together the outer surface of the outer ring and the fixed surface within the housing; and
   a bonding agent inserted into the fifth access means so that the bonding agent bonds together the outer surface of the inner ring and the inner surface of the third hole.

2. The optical alignment apparatus of claim 1 wherein the attachment means includes adjustment means to move the first optical component parallel to its optical axis.

3. The optical alignment apparatus of claim 2 further including at least one third access means providing access to the adjustment means, and a bonding agent inserted into the third access means and into the adjustment means so that the bonding agent fixes the adjustment means and prevents further adjustment.

4. An optical alignment apparatus comprising:
   a housing;
   a first optical component, with an optical axis, mounted within the housing by attachment means;
   a sleeve with an axis, located within the housing, with one end of the sleeve located adjacent to the first optical component and with the sleeve including a first hole with an axis, with one end of the first hole located adjacent to the first optical component;
   a second optical component fixed within the first hole in the sleeve, with one end of the second optical component adjacent to the first optical component;
   pivot means connecting the sleeve to the housing at a location adjacent to the end of the sleeve nearest to the first optical component;
   an outer ring with an axis, the outer ring located remote from the pivot means, with an outer surface of the outer ring contacting a fixed surface within the housing so that the outer ring can rotate on its axis, with the outer ring including a second hole with an inner surface and an axis, and with the axis of the second hole offset from but parallel to the axis of the outer ring;
   an inner ring with an axis, the inner ring located within the second hole and remote from the pivot means, with an outer surface of the inner ring contacting the inner surface of the second hole so that the inner ring can rotate on its axis, with the inner ring including a third hole with an inner surface and an axis, and with the axis of the third hole offset from but parallel to the axis of the inner ring;
   with the sleeve mounted within the third hole in the inner ring, and the outer surface of the sleeve contacting the inner surface of the third hole;
   at least one first access means located so that the first access means provides access to the outer surface of the outer ring and the fixed surface within the housing;
   at least one second access means located so that the second access means provides access to the outer surface of the inner ring and the inner surface of the second hole;
   a bonding agent inserted into the first access means so that the bonding agent bonds together the outer surface of the outer ring and the fixed surface within the housing; and
   a bonding agent inserted into the second access means so that the bonding agent bonds together the outer surface of the inner ring and the inner surface of the second hole.

* * * * *